Figure 1:
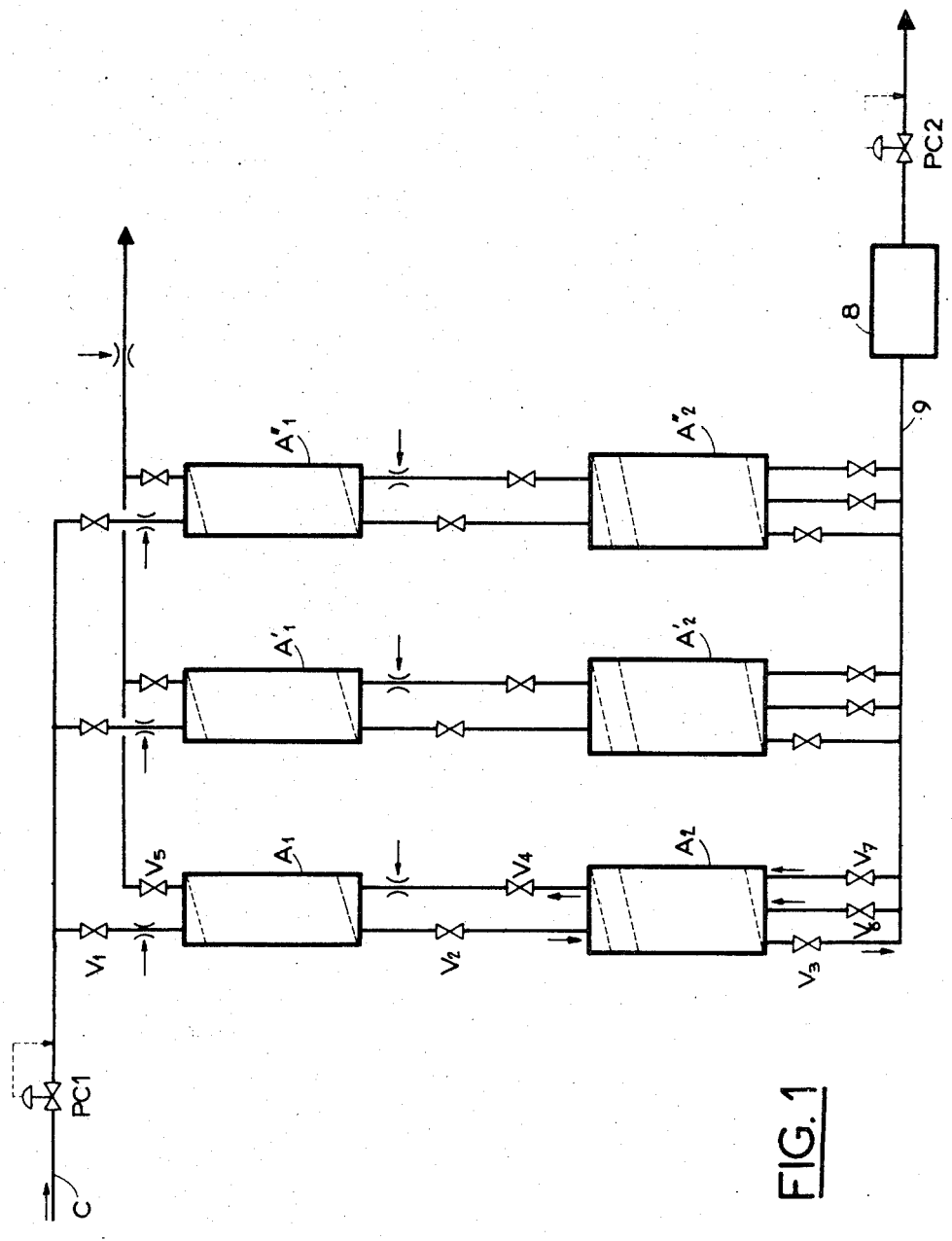

United States Patent
Simonet et al.

[15] 3,702,525
[45] Nov. 14, 1972

[54] IMPROVED GAS PURIFYING PROCESS AND APPARATUS

[72] Inventors: Guy A. Simonet; Pierre F. Lesur, both of Paris, France

[73] Assignee: L'Air Liquide, Societe Anonyme pour l'Etude et l'Exploitation des Procedes Georges Claude, Paris, France

[22] Filed: Nov. 30, 1970

[21] Appl. No.: 93,718

[30] Foreign Application Priority Data

Dec. 3, 1969 France..................6941703

[52] U.S. Cl. ..........................55/25, 55/62, 55/70
[51] Int. Cl. ........................................B01d 53/04
[58] Field of Search..................55/25, 58, 62, 70

[56] References Cited

UNITED STATES PATENTS

| | | | |
|---|---|---|---|
| 3,638,398 | 2/1972 | Domine et al. | 55/25 |
| 3,252,268 | 5/1966 | Stark | 55/25 |
| 2,992,703 | 7/1961 | Vasan et al. | 55/70 |
| 3,085,379 | 4/1963 | Kiyonaga et al. | 55/58 |
| 3,343,916 | 9/1967 | Cahn et al. | 55/62 |
| 3,564,816 | 2/1971 | Batta | 55/62 |

*Primary Examiner*—Charles N. Hart
*Attorney*—Browdy and Neimark

[57] ABSTRACT

An improved gas purifying process and apparatus, for example, the purification of purging gases originating from an ammonia synthesis installation, with the object of recovering one of the constituents of these gases, for example hydrogen, by means at least one adsorption mass, in which the rise in the pressure following the elution and preceding the isobaric adsorption, is effected in the first chamber by admission of gas to be purified, and is effected simultaneously in the second chamber in two stages, the first of which is a raising of the front to an intermediate pressure by means of a constituent, such as the purified hydrogen, the said isobaric adsorption only starting when the working pressure is reached in the said two chambers, the two chambers being isolated during this operation.

5 Claims, 2 Drawing Figures

AN IMPROVED GAS PURIFYING PROCESS AND APPARATUS

The present invention relates to an improved gas purifying process and apparatus for example, the purification of purging gases originating from ammonia synthesis installations, with a view to recovering one of the constituents of these gases, for example hydrogen.

It is known that the purging gases originating from ammonia synthesis installations generally have a composition consisting of hydrogen, nitrogen, methane, argon and ammonia, approximately equal in volume to:

| | | |
|---|---|---|
| $H_2$ | = | 63–65 % |
| $N_2$ | = | 22 % |
| $CH_4$ | = | 8 to 9 % |
| Ar | = | 3 to 4 % |
| $NH_3$ | = | 1 to 2 %. |

These purging gases are obtained under a pressure which is generally of the order of 300 bars, and in accordance with a total rate of flow equal to 6,000 m³/h (at n.t.p.) for a synthesis installation of 1,000 tons/day of $NH_3$.

It is possible to provide several destinations for these gases. For example, they can be burnt to give some of the calories necessary for reforming, leading to the production of hydrogen, upstream of the ammonia synthesis, or they can be treated to permit the recovery with a high degree of purity, of the hydrogen which they contain.

Different techniques permit this hydrogen to be recovered. It is in particular possible to treat these purging gases in a unit at low temperature in order separately to recover the hydrogen, argon, methane, nitrogen and ammonia. It is also possible to bring these purging gases into contact with at least one mass which has the property of adsorbing the components of the purging gas, other than the hydrogen.

The present invention does in fact have as its object an improvement in the processes in which the purification of purging gases is effected by means of at least adsorption mass.

It is in fact known to treat the purging gas coming from ammonia synthesis installations at ambient temperature by passing the gas over at least one adsorption mass which has the property of adsorbing the components of the purging gas other than the hydrogen. The regeneration of at least this adsorbant mass is effected by circulation, counter-current to the adsorption direction, of purified hydrogen, expanded to a pressure lower than the pressure at which the adsorption has taken place, and preferably expanded to atmospheric pressure. These treatments are generally effected in a treatment unit which comprises two batteries each formed of at least one adsorber; one battery is regenerated during at least one adsorber; one battery is regenerated during at least part of the time during which the adsorption is effected in the other battery. These batteries contain at least one adsorption mass which is selective with respect to at least one of the constituents of the purging gas.

However, in the case where the purging gas contains impurities, as for example ammonia, of which the desorption is particularly difficult, and which have a tendency to poison the adsorbent, it is found that the known methods of desorption by purified hydrogen obtained during the adsorption treatment passing over the mass to be regenerated do not give complete satisfaction, unless very large quantities of purified hydrogen pass through the mass to be regenerated, which is not very satisfactory from an economic point of view.

The present invention is concerned more particularly with the regeneration of adsorption masses and has for its object an improved regeneration process which is truly economical and which requires appreciably smaller quantities of purified product for effecting the said regeneration.

The present invention has for its object an improved process for purifying gases, for example, purging gas originating from ammonia synthesis installations, with the object of recovering one of the constituents of these gases, such as hydrogen, in which the purification of the gases is effected by isobaric adsorption by at least two adsorption masses placed in two separate chambers, and the regeneration is at least effected by circulation, counter-current to the direction of adsorption of the said expanded, purified constituent, obtained during the adsorption treatment, and in which said process the rise in pressure succeeding the elution and preceding the isobaric adsorption is effected in the first chamber by admission of gas to be purified and is simultaneously effected in the second chamber in two stages, in which the first is a rise of front up to an intermediate pressure by means of a constituent such as purified hydrogen, and the second stage is an admission of gases to be purified, the said isobaric adsorption only starting when the working pressure is reached in the said two chambers, the two chambers being isolated during this operation.

This process is of particular interest in the case where the purging gas contains a component difficult to desorb and of which the adsorption is carried out on the mass contained in the first chamber, because it permits the maximum use of the expansion effect for the regeneration of this mass and, in addition, permits a reduction in the quantities of purified hydrogen which are necessary for bringing the desorption to completion.

According to another embodiment of the present invention, the rise in pressure succeding the elution and preceding the isobaric adsorption is effected in the first chamber by admission of gases to be purified and is effected simultaneously in the second chamber in two stages, of which the first is a rise of the front to an intermediate pressure by means of purified hydrogen and the second stage is an admission of gases to be purified, the said isobaric adsorption only starting when the working pressure is reached in the said two chambers.

The present invention has for its object any installation for carrying out this process.

Other objects and advantages of the present invention will become apparent from reading the following description and by reference to the accompanying Figures, given by way of example.

FIG. 1 represents an installation comprising three lines of adsorbers, these being lines A, B, and C. Each line comprises two adsorbers operating at a working pressure of 40 bars.

The first adsorbers $A_1$, $A_1$, and $A_1$ have a capacity of 2.4 m³ and contain a charge of aluminum oxide. The second adsorbers $A_2$, $A_2$, and $A_2$ have a capacity of 4.8 m³ and contain two charges; one is formed by active carbon and the other by a molecular sieve (for example, the molecular sieve known under the name $AC_4$).

5,500 m³/h (at n.t.p.) of purging gas coming from an ammonia synthesis installation, at about 200 bars, enter the installation as illustrated by way of the conduit C. This gas is expanded in a pressure regulating expansion device PC1 to a constant pressure of effectively 38 bars. At the outlet from the installation, there are collected 1,660 m³ (at n.t.p.) of hydrogen with a purity of 99.5 percent at a pressure of effectively 35 bars.

Each adsorption line comprises:
 – an admission valve $V_1$ (orifice 40 mm)
 – a connecting valve $V_2$ (orifice 40 mm)
 – a withdrawal valve $V_3$ (orifice 40 mm)
 – a connecting valve $V_4$ (orifice 100 mm)
 – an air-connection valve $V_5$ (orifice 100 mm)
 – a front-raising valve $V_6$ (orifice 25 mm)
 – an elution valve $V_7$ (orifice 16 mm).

These valves are automatically controlled by a sequential arrangement (not shown), the cycle of which is described below.

Certain of these valves ($V_1$, $V_2$, $V_4$, and $V_5$) are equipped with a flow regulator ensuring the constancy of the rate of flow during the pressure variations.

A buffering space 8 with a volume of 11 m³ is provided on the outlet pipe 9. This space permits the raising of the front to be assured.

A pressure regulating expansion device PC2 ensures a constant pressure of effectively 35 bars for the supply to a hypercompressor situated downstream (not shown).

Figure 2:
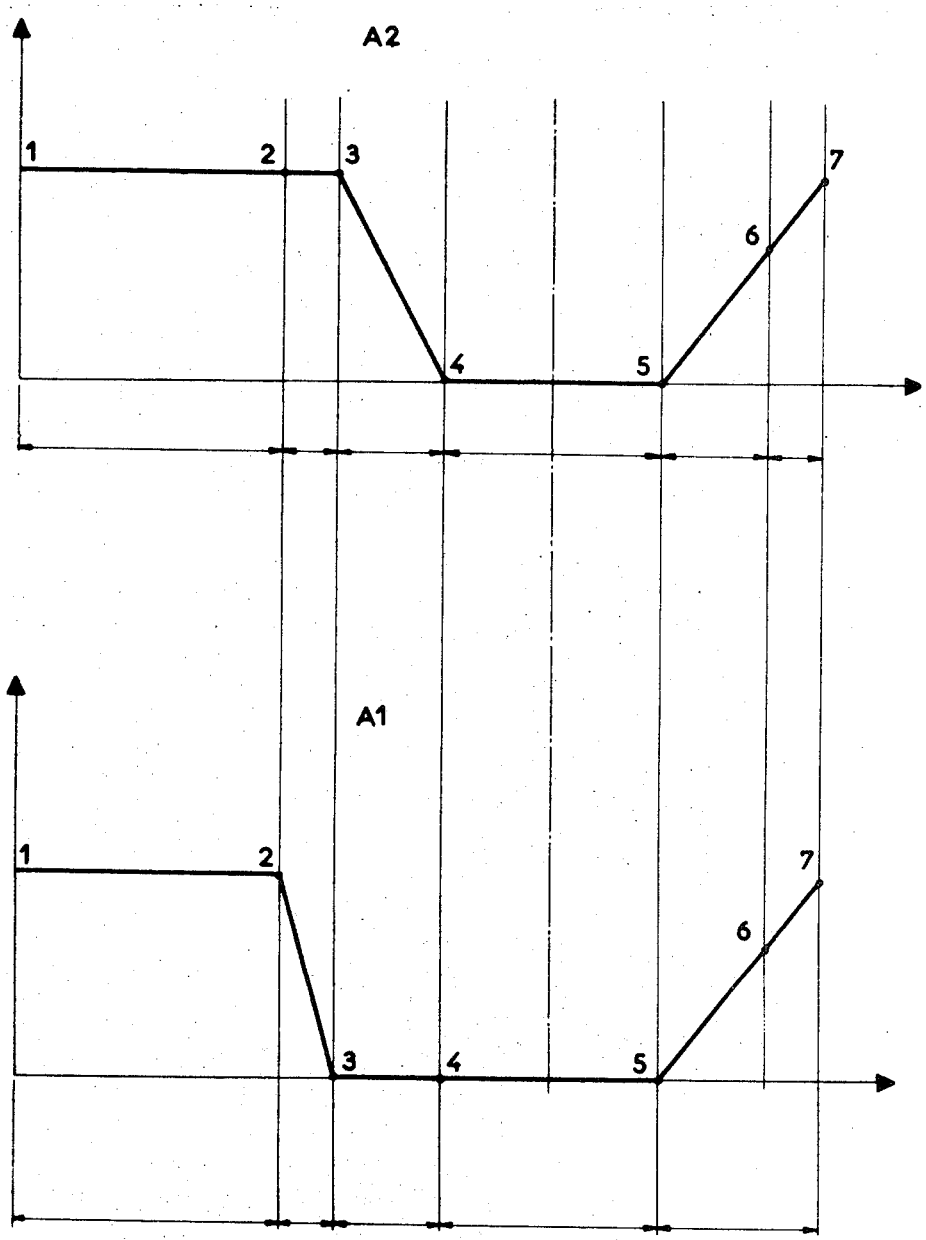

The complete period of one cycle on each adsorption line is 15 minutes. This cycle is composed of the following phases, which it is possible to follow on the graphs given in FIG. 2, which represent the pressure diagrams for an adsorber $A_1$ at the bottom and an adsorber $A_2$ at the top of FIG. 2:

isobaric production (1 to 2, lower part of FIG. 2).

The valves $V_1$, $V_2$, and $V_3$ of the line A are open. The impure hydrogen passes through $V_1$ to the adsorber $A_1$ at 38 bars. The pure hydrogen leaves the adsorber $A_2$ by way of $V_3$ at 38 bars. The duration of the operation is 5 minutes.

connection of $A_1$ to air (2 to 3, lower part of FIG. 2).

The valves are all closed, except the valve $V_5$, which is open.

The pressure in the adsorber $A_1$ passes from 38 bars to atmospheric pressure. The time of the operation is 1 minute.

connection of $A_2$ to air (3 to 4, top part of FIG. 2).

Only the valves $V_4$ and $V_5$ are open.

The pressure in the adsorber $A_2$ passes from 38 bars to atmospheric pressure. The time of the operation is 2 minutes.

elution at atmospheric pressure of $A_1$ and $A_2$ (4 to 5, FIG. 2).

Only the valves $V_7$, $V_4$, and $V_5$ are open.

The purified hydrogen produced at the same moment by one line in isobaric phase (or coming from the buffering space 8) enters the adsorber $A_2$ by way of $V_7$ and leaves $A_1$ charged with impurities by way of $V_5$. The time of the operation is 4 minutes.

raising of the front in $A_2$ (5 to 6, top part of FIG. 2).

The pressure in the adsorber $A_2$ is brought from atmospheric pressure to a pressure of effectively 25 bars by means of purified hydrogen entering $A_2$ by way of $V_6$ and $V_7$.

Only the valve $V_6$ is open. This operation lasts 2 minutes.

admission of the mixture into $A_1$ (5 to 6, bottom part of FIG. 2).

The pressure passes from atmospheric pressure to effectively 25 bars.

Only the valve $V_1$ is open. The operation lasts 2 minutes.

This operation takes place simultaneously with the rise in the front in $A_2$ (5 to 6, top part of FIG. 2) as above.

admission of the mixture (6 to 7, FIG. 2).

The effective pressure of 25 bars is brought to 38 bars in the two chambers.

The valves $V_1$ and $V_2$ are open and the operation lasts 1 minute.

The cycle is open then repeated.

The following examples are given simply by way of illustration and have no limiting character.

They are presented in the form of the following table, permitting the comparison between the various tests.

The installation of FIGS. 1 is used to effect the following cycle:
rise in pressure on $A_2$
admission on $A_1$ up to P (bars)
rise in pressure on $A_2$
admission on $A_1$ and $A_2$
connection of $A_1$ to air
connection of $A_2$ to air by way of $A_1$
elution of $A_2$ and $A_1$ by $H_2$ under 1 atm. gauge.

The hydrogen used for the rise in pressure is pure hydrogen coming from a supply in bottles.

Obviously, the invention is not in any way limited to the embodiments described and illustrated, and it is capable of numerous other modifications, available to the person skilled in the art, depending on the proposed applications, without thereby departing from the spirit of the invention.

It is in particular obvious that any other gas can be treated by the method of the invention and that the application to purging gases of ammonia synthesis installations is only given as an example.

It is evident that the purified hydrogen thus produced can in particular be reintroduced into the ammonia synthesis installation, upstream of this synthesis.

| Adsorbent on $A_1$ | Rise in pressure with pure gas | | Working pressure, bars | Vol. of $H_2$ under working pressure, V litres | Elution percent of product | Number of cycles effected | Impurity content of produced $H_2$, v.p.m. total | Rate of extraction, percent of $H_2$ |
|---|---|---|---|---|---|---|---|---|
| | Gas | P, bars | | | | | | |
| Aluminium oxide | $H_2$ | 10 | 20 | 200 | 25 | 4 | 100 | 34.4 |
| | $H_2$ | 15 | 20 | 230 | 16 | 4 | 100 | 52 |
| | $H_2$ | 10 | 20 | 170 | (a) | 5 | 500 | 54 |
| | Recovery ISO | 10 | 20 | 170 | | 1 | 800 | 54 |
| | | | 30 | 160 | 32 | 3 | 100 | 37 |
| Aluminium oxide | $H_2$ | 10 | 30 | 220 | 16 | 4 | 100 | 41.5 |
| | $H_2$ | 15 | 30 | 260 | 16 | 3 | 100 | 43.6 |
| | $H_2$ | 20 | 30 | 290 | 16 | 5 | (b) | 48 |
| | $H_2$ | 30 | 30 | 350 | 16 | 4 | 200 | 39 |
| Silica gel | $H_2$ | 20 | 30 | 280 | 16 | 8 | 100 | 40 | a Part recovery of $C_2$ (air connection).
b Ar 15, $N_2$ 36.

What we claim is

1. An improved gas purification process, which comprises the use of at least one adsorbent disposed in two chambers connected in series, wherein the first chamber is provided with an inlet for receiving a mixture of gases to be purified and an outlet connected to the second chamber and wherein the second chamber is provided with an outlet for delivering the purified gas thus obtained, the purification process including a purification step comprising passing the mixture of gases to be purified through the first and second chambers substantially at the same pressure, whereby at least one component is adsorbed by said adsorbent, and including a regeneration step which comprises:
cutting off the supply of the mixture of gases to be purified to said first and second chambers,
isolating said first and second chambers from one another,
reducing the pressure in the first chamber until reaching the regeneration pressure, the mixture of gases contained in the first chamber being drawn off countercurrently to the adsorption direction,
bringing the first and second chamber into communication with one another while maintaining the regeneration pressure in the first chamber, the mixture of gases contained in the second chamber being drawn off after passage through the first chamber,
passing a gaseous eluent through the first and second chambers whereby at least a part of the component which has been adsorbed by said adsorbent is desorbed into said eluent,
admitting the mixture of gases to be purified to the first chamber whereby the pressure in said chamber rises, while admitting into the second chamber concurrently to the adsorption direction purified gas whereby the pressure in the second chamber rises to an intermediate pressure, and
admitting the mixture of gases to be purified to the first and second chambers whereby the pressure in said first and second chamber rises to the adsorption pressure.

2. A method in accordance with claim 1 wherein said gases to be purified consist essentially of purging gas originating from ammonia synthesis and wherein the impurities in said ammonia synthesis gas are adsorbed leaving hydrogen with a purity of approximately 99.5 percent.

3. A process in accordance with claim 2 wherein adsorption is carried out in several parallel lines simultaneously and wherein the complete period of one cycle on each adsorption line is 15 minutes.

4. A process in accordance with claim 2 wherein said pressure purification is about 38 bars, said regeneration pressure is atmospheric, and wherein said intermediate pressure is about 25 bars.

5. An adsorption apparatus comprising a plurality of parallel lines, each said line containing a set of said two chambers connected in series, the first of each of said two chambers being smaller and containing a charge of aluminum oxide and the second of said two chambers being larger and containing both active carbon and a molecular sieve, each said line containing an admission valve upstream from said first chamber and having an orifice of 40 mms, a first pipe passing from said first chamber to said second chamber and containing a connecting valve having an orifice of 40 mms., a second pipe exiting from said second chamber and containing a withdraw valve having an orifice of 40 mms., a third pipe passing from said second chamber to said first chamber and containing a second connecting valve having an orifice of 100 mms., a fourth pipe exiting from said first chamber and containing an air connection valve having an orifice of 100 mms., a fifth pipe leading to said second chamber and containing a front raising valve having an orifice of 25 mms. and a sixth pipe passing to said second chamber and containing an elution valve having an orifice of 16 mms.

* * * * *